United States Patent Office 3,137,734
Patented June 16, 1964

3,137,734
PREPARATION OF ALKYL AND ALKENYL DERIVATIVES OF REACTION PRODUCTS OF DECABORANES AND ACETYLENIC COMPOUNDS
Earl W. Cox, Washington, D.C., and Theodore L. Heying, Palo Alto, Calif., assignors to Olin Mathieson Chemical Corporation, a corporation of Virginia
No Drawing. Filed Dec. 14, 1960, Ser. No. 75,873
11 Claims. (Cl. 260—606.5)

This invention relates to organoboron compounds and to a method for their preparation. The organoboron compounds of this invention are prepared by reacting successively with an alkali metal alkyl or alkali metal aryl, and an alkyl or alkenyl halide, an organoboron compound of the class RR'B$_{10}$H$_8$(CR"CR''') wherein R and R' are each selected from the class consisting of hydrogen and an alkyl radical containing from one to five carbon atoms, wherein R" and R''' are each selected from the class consisting of hydrogen, an alkyl radical and a monoalkenyl hydrocarbon radical, at least one of R" and R''' being hydrogen, and the total number of carbon atoms in R" and R''' taken together not exceeding eight. The reaction products prepared by the method of this invention can be either solid or liquid and are useful as fuels.

The organoboron compounds of the above class can be prepared as set forth in application Serial No. 813,032, filed May 13, 1959, of Ager, Heying and Mangold. In general, these compounds can be prepared by reacting decaborane or an alkylated decaborane having one to two alkyl groups containing 1 to 5 carbon atoms in each alkyl group with an acetylenic hydrocarbon containing from two to ten carbon atoms in the presence of a wide variety of ethers, nitriles or amines. For example, $$B_{10}H_{10}(CHCH)$$

can be prepared by reacting for about 12 hours at 125° C. a mixture of decaborane and tetrahydrofuran in an autoclave pressured to 100 p.s.i. with acetylene.

In accordance with the present invention, it was discovered that compounds of the above class can be reacted successively with an alkali metal alkyl or aryl and an alkyl or alkenyl halide to produce organoboron compounds.

The preferred alkali metal alkyls are the lithium alkyls such as methyl lithium, ethyl lithium, isopropyl lithium, n-propyl lithium, n-butyl lithium, sec-butyl lithium, t-butyl lithium, n-amyl lithium, and the like, since they are soluble in inert organic solvents. Other alkali metal alkyls, such as the sodium and potassium alkyls can, however, also be employed as can the alkali metal aryls including phenyl lithium.

The alkyl halides and alkenyl halides employed as reactants in this invention may contain from 1 to 5 carbon atoms in the alkyl or alkenyl radical. The preferred alkyl halides useful in this invention are methyl, ethyl, propyl, isopropyl, n-butyl, t-butyl and amyl. Suitable alkenyl halides include, for example, vinyl, allyl, propenyl, isopropenyl and pentenyl.

The ratio of reactants can be varied widely, generally being within the range of 0.1 to about 10 moles of the alkali metal or aryl per mole of organoboron compound with the preferred range being from 1 to about 3 moles of the alkali metal alkyl or aryl per mole of organoboron compound employed and 0.1 to about 15 moles of the alkyl or alkenyl halide per mole of the organoboron compound with the preferred range being from 1 to about 5 moles of the alkyl or alkenyl halide per mole of the organoboron compound. The temperature of the reaction can also be varied widely from about −50° C. to about 60° C., preferably between −20° C. and 30° C. The reaction pressure can vary from subatmospheric to several atmosphere, i.e. from about 0.3 to 15 atmospheres or more, although atmospheric reactions are convenient. Although the reaction of the alkyl or alkenyl halide with the alkali metal alkyl or aryl-organoboron reaction product is substantially instantaneous, the halide is added very slowly to the mixture to prevent overheating. The complete reaction generally requires about 0.5 to 30 hours depending upon the ratio of reactants, solvent employed and the temperature and pressure of the reaction. Although not required, the reaction can, if desired, be conducted in a solvent common for the reactants but inert thereto. Suitable solvents include ethers such as diethyl ether, dimethyl ether, methyl ethyl ether, di-isopropyl ether and tetrahydrofuran; aliphatic hydrocarbon solvents such as n-pentane, and hexane and aromatic hydrocarbon solvents such as benzene, toluene and xylene.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

A major advantage of the novel liquid products of this invention is the high stability they exhibit at elevated temperatures. One of the shortcomings of many high energy fuels is their limited stability at the high temperatures encountered in their use. The liquid products of this invention, however, exhibit relatively little decomposition even after having been maintained at 500° or 750° F. for periods of twenty-four hours and more, thus rendering them well suited for more extreme conditions of storage and use. In addition, the liquid products of this invention are also of high density.

The process of this invention is illustrated in detail by the following examples. In the examples, the term "moles" signifies gram moles.

EXAMPLE I

A three-neck flask which had been fitted with an addition funnel, a stirrer and a thermometer was evacuated and 144 grams (1.0 mole) of B$_{10}$H$_{10}$CHCH dissolved in approximately 450 ml. of diethyl ether was added to the flask. The temperature of this solution was lowered to approximately −10° C. by immersion of the reaction flask in an acetone Dry-Ice bath. A stoichiometric amount of phenyl lithium, 84 grams (1 mole), was added rapidly (approximately 50 ml. per minute). The temperature of the reaction mixture was maintained at −10° C. throughout the addition. After the addition was complete, the temperature of the reaction mixture was allowed to rise to 0° C. and was maintained at this temperature for 15 minutes.

In the next step the temperature of the reaction mixture was again lowered to −10° C. and 133 grams (1.1 moles) of allyl bromide dissolved in an equal volume of ether was added dropwise to the mixture while the temperature was maintained at −10° C. After the allyl bromide addition was complete the temperature of the reaction mixture was allowed to rise to 10° C. and was maintained at this temperature for 15 minutes. Upon completion of the reaction an amount of dilute hydrochloric acid sufficient to decompose any unreacted materials and to dissolve the lithium bromide which formed during the reaction was added. The water and ether layers were separated and the water layer discarded while the ether layer was dried over anhydrous calcium chloride. From the dried ether layer, the ether was removed by distillation at a pressure of approximately 12 mm. Hg. Unreacted $B_{10}H_{10}CHCH$ was sublimed from the resulting mixture at 100° C. and a pressure of approximately 0.1 mm. Hg.

The crude reaction product, which was mainly $$B_{10}H_{10}CHCCH_2CH=CH_2$$

was distilled at a pressure of 0.1 to 0.05 mm. Hg and the fraction boiling between 65° C. and 85° C. was collected. This slightly impure $B_{10}H_{10}CHCCH_2CH=CH_2$ contained a trace amount of $B_{10}H_{10}CHCH$ and $$B_{10}H_{10}C(CH_2CH=CH_2)C(CH_2CH=CH_2)$$

The product was further purified by refluxing with about 20 grams of phenyl lithium and 50 ml. of diethyl ether for approximately 2 hours. Upon distillation, 125 g. (79.1 percent yield) of $B_{10}H_{10}CHCCH_2CH=CH_2$ was obtained (B.P. 65° C./.005 mm.–85° C./0.5 mm.). Chemical analysis of the product showed that it contained 57.8 percent boron as compared to a theoretical value of 58.8 percent boron for $B_{10}H_{10}CHCCH_2CH=CH_2$.

EXAMPLES II–VIII

Examples II through VIII were performed in a manner similar to Example I. The pertinent data are presented in Table 1.

ether, unreacted $B_{10}H_{10}CHCH$ was sublimed from the reaction mixture at 100° C. and at a pressure of 0.5 to 0.1 mm. Hg. The remaining liquid was vacuum distilled and a total of 54.5 g. (86.0 percent yield) of $$B_{10}H_{10}CHCCH_2CH=CH_2$$

was obtained (B.P. 65° C./0.1 mm.–75° C./0.5 mm.). An analysis showed that the material contained 56.0 percent boron.

EXAMPLE X

In this example, which was performed in the same general manner as Example IX, 181 grams (80.4 percent yield) of $B_{10}H_{10}CHCCH_2CH=CH_2$ were obtained from the reaction of 202 g. (1.4 moles) of $B_{10}H_{10}CHCH$, 86 g. (1.35 moles) of butyl lithium and 157 grams (1.3 moles) of allyl bromide at 34° C. for 3 hours.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter

*Table 1*

| Example | $B_{10}H_{10}CHCH$ (Grams) | Phenyl Lithium (Grams) | Allyl-bromide (Grams) | Temperature (° C.) | Time (Minutes) | $B_{10}H_{10}CHCCH_2CH=CH_2$ Yield [1] | | Boron (Percent) |
|---|---|---|---|---|---|---|---|---|
| | | | | | | (Grams) | (Percent) | |
| I | 144 | 84 | 133 | −10 to +10 | 60 | 125 | 79.1 | 57.8 |
| II | 128 | 67 | 109 | −10 to +10 | 60 | 108 | 77.6 | |
| III | 131 | 76 | 121 | −10 to +10 | 60 | 95 | 64.0 | 57.4 |
| IV | 288 | 168 | 266 | −10 to +10 | 60 | 254 | 79.2 | 57.5 |
| V | 282 | 168 | 266 | −10 to +10 | 60 | 241 | 81.4 | 57.5 |
| VI | 576 | 336 | 532 | −10 to +10 | 60 | 519 | 79.1 | |
| VII | 576 | 336 | 532 | −10 to +10 | 60 | 528 | 81.4 | 56.9 |
| VIII | 576 | 336 | 532 | −10 to +10 | 60 | 518 | 80.6 | |

[1] Corrected yield based upon the $B_{10}H_{10}CHCH$ which reacted.

EXAMPLE IX

A total of 62 grams (0.43 mole) of $B_{10}H_{10}CHCH$ dissolved in approximately 250 ml. of diethyl ether was added to a previously evacuated, three-neck flask equipped with a water condenser, an air stirrer and an addition funnel. N-butyl lithium (25.6 g., 0.40 mole) was added dropwise with stirring. The contents of the reaction flask were maintained at reflux throughout the addition by means of a cooling bath. Upon completion of the n-butyl lithium addition step, the mixture was stirred for an additional hour.

Allyl bromide in the amount of 52 grams dissolved in an equal volume of ether was added dropwise to the reaction flask and the resulting mixture was allowed to reflux with stirring for two hours.

An excess of dilute hydrochloric acid was added to the mixture to decompose any unreacted materials and to dissolve the lithium bromide formed during the reaction. The ether and water layers were separated and the water layer was extracted four times with about 200 ml. quantities of ether. The combined ether layers were dried over night with calcium chloride. Then the dried ether layer was distilled at a reduced pressure of approximately 12 mm. Hg to remove the ether. After removal of the intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The liquid products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the higher energy fuels of the present invention, because of their higher heating values in comparision with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuel presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600° to 1650° F. Operation at these peak temperatures is limited to periods of approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aicraft gas turbine fuels in admixture with the hydrocarbons presently being used, such as JP-4. When such mixtures are used, the fuel-air ratio in the zone of the combustion where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operation with conventional aircraft fuels.

The burning characteristics of the liquid products of this invention are such that good combustion performance can be attained even at the marginal operation conditions encountered at hgih altitudes, insuring efficient and stable combustion and improvement in the zone of operation before lean and rich extinction of the combustion process is encountered, significant improvement in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substitlted for hydrocarbon fuels and used in the established manner.

What is claimed is:

1. A method for the preparation of an organoboron compound which comprises reacting (A) a boron compound of the class $RR'B_{10}H_8(CR''CR''')$, wherein R and R' are selected from the class consisting of hydrogen and alkyl radicals of one to five carbon atoms and wherein R'' and R''' are selected from the class consisting of hydrogen, alkyl radicals and monoalkenyl radicals, at least one of R'' and R''' being hydrogen, and the total number of carbon atoms in R'' and R''' taken together not exceeding eight, successively with (B) a material selected from the class consisting of alkali metal alkyls and alkali metal aryls, and (C) a halide selected from the class consisting of alkyl halides and alkenyl halides.

2. The method of claim 1 wherein the boron compound is $B_{10}H_{10}(CHCH)$.

3. The method of claim 1 wherein the said material is an alkali metal alkyl.

4. The method of claim 3 wherein the alkali metal alkyl is a lithium alkyl.

5. The method of claim 3 wherein the alkali metal alkyl is n-butyl lithium.

6. The method of claim 1 wherein the said halide is allyl bromide.

7. The method of claim 1 wherein the boron compound is $B_{10}H_{10}(CHCH)$, the alkali metal alkyl is n-butyl lithium and the said halide is allyl bromide.

8. The method of claim 1 wherein the said material is an alkali metal aryl.

9. The method of claim 8 wherein the alkali metal aryl is a lithium aryl.

10. The method of claim 8 wherein the alkali metal aryl is phenyl lithium.

11. The method of claim 1 wherein the boron compound is $B_{10}H_{10}(CHCH)$, the alkali metal aryl is phenyl lithium and the said halide is allkyl bromide.

No references cited.